UNITED STATES PATENT OFFICE.

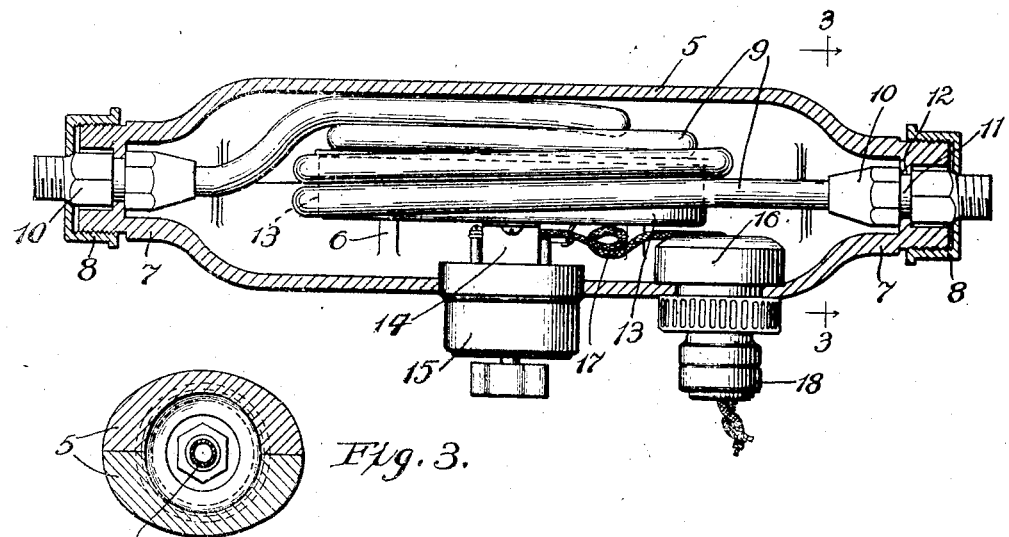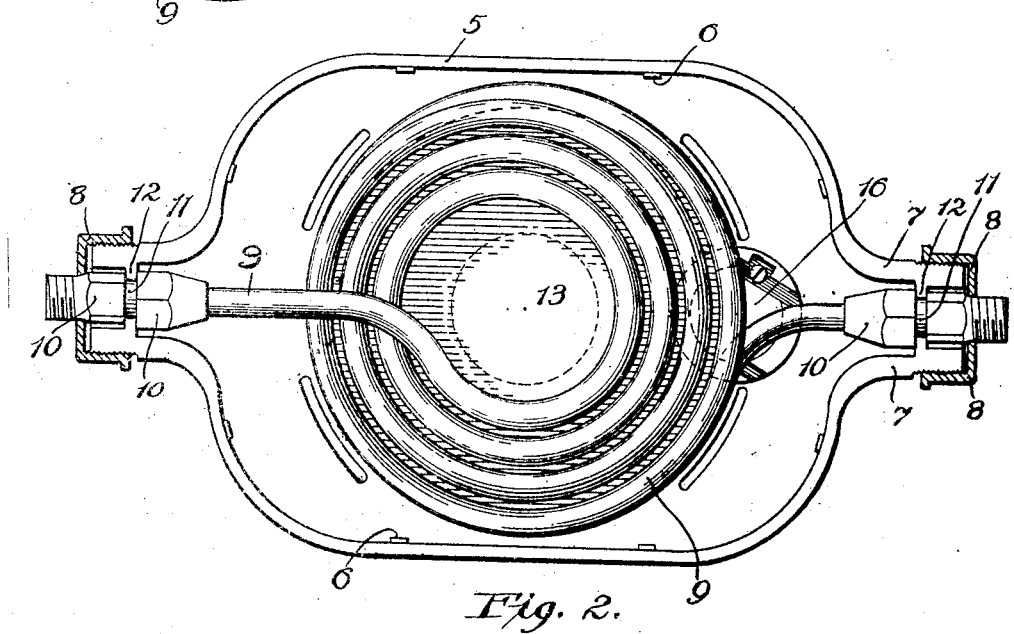

JENS A. PAASCHE, OF CHICAGO, ILLINOIS.

ELECTRIC FLUID-HEATER.

1,293,896.  Specification of Letters Patent.  Patented Feb. 11, 1919.

Application filed October 25, 1915. Serial No. 57,958.

*To all whom it may concern:*

Be it known that I, JENS A. PAASCHE, a citizen of the United States, residing at Chicago, in the county of Cook and State of Illinois, have invented certain new and useful Improvements in Electric Fluid-Heaters, of which the following is a specification.

In my prior application, Serial No. 52,139, filed September 23, 1915, I have disclosed a pneumatic coating apparatus in which the air and also the coating material is heated before passing to the air brush.

The object of the present invention is to produce an improved electric heater which is particularly adapted for use in such a pneumatic coating apparatus which will effectively heat the large current of air supplied to the air brush and will also serve to heat the coating material contained in the supply tank which is connected to the brush.

In its more specific aspects, the invention refers to an improved construction of the casing for the heater, to the means for mounting or attaching the air tube therein, and to the general arrangement of the elements of the heater with a view to rapidity and ease in assembling and to effectiveness in the results desired.

In the accompanying drawings, Figure 1 is a vertical central section through an electric heater embodying the features of my invention. Fig. 2 is a plan view with the upper half of the casing removed and parts shown in section. Fig. 3 is a cross section in the plane of line 3—3 of Fig. 1, looking in the direction of the arrows.

In the preferred form shown in the drawings, the heater comprises a thin, flat casing 5 which is divided in a plane at right angles to its shortest dimension into two substantially similar half-sections. Lugs 6 projecting up from the edges of one or both of the sections engage the other section to prevent relative slipping movement when associated.

The opposite ends of the casing are formed into neck portions 7, the dividing line between the sections being along the axis of said neck portions. The two sections are secured together by glands or nuts 8 threaded onto these neck portions.

The tube 9 through which the air flows through the heater is turned into a suitable number of coils occupying the central portion of the casing, the ends of the tube extending in opposite directions and each having a head 10 thereon which is inclosed by one of the neck portions 7, the outer ends of said heads projecting through the glands 8 and being threaded for attachment to suitable conduits for conducting air to and from the heater. Each head 10 has an annular groove 11 therein to receive an internal rib 12 within the neck 7 so that when the gland is turned up tightly the head 10 will be securely clamped in place.

An electric heating device 13, preferably of flat circular shape and relatively thin, is positioned within the coils of the tube 9, some of the coils, in the present instance, running around the periphery of said heating device and some lying along the upper face thereof. A bracket 14 is secured to the lower side of the heating device and to this bracket is fixed a switch 15 which projects through a hole in the casing and is electrically connected to the heating device 13. This switch is preferably of the character having a plurality of different positions so that it will act not only to entirely cut off the current from the device 13, but will act in different positions to allow different amounts of current to pass through the heater so that several degrees of heat may be obtained from the latter, for example, low, medium and high. A socket 16 of any common or preferred construction is mounted in an opening in the lower wall of the casing and is connected by wires 17 to the switch 15, power being supplied to the socket by a plug 18 which is connected to a suitable source of supply.

The shape of the casing and the arrangement of the elements therein makes the heater particularly adapted not only to heat the air passing through the tube 9, but also to act as a heater on or over which may be placed a receptacle containing painting fluid to be supplied to an air brush. The heating device 13 being located quite close to the top of the casing will be ample for the latter purpose.

The parts of the heater may be assembled very quickly and easily. The heating device 13, bracket 14, and switch 15 need not be secured to the casing but are held in place with sufficient security by the coils of the tube 9, so that every part but the socket 16 is virtually held in place by the glands 8.

The foregoing detailed description is not intended as a limitation of the invention to the exact embodiment disclosed. The scope of the invention is pointed out in the appended claims.

I claim as my invention:

1. An electric heater having, in combination, a casing comprising two shallow complementary half sections, said sections being shaped to provide projecting neck portions at opposite ends of the casing, a tube for the fluid to be heated having a plurality of coils within said casing, the ends of said tube extending in opposite directions and having heads fixed thereon which occupy said neck portions of the casing, nuts threaded on said neck portions to secure the two casing sections together, an electric heating device within the casing adjacent to the coils of said tube, and means for supplying said heating device with electric energy.

2. An electric heater having, in combination, a casing comprising two complementary sections shaped to provide two projecting neck portions, a conductor for the fluid to be heated located within said casing and having its ends extending into said neck portions, devices engaging said neck portions for securing the casing sections together, and electric heating means within the casing for heating said conductor.

3. An electric heater having, in combination, a casing formed in sections shaped to provide two outlets, a conductor within the casing having its ends projecting through said outlets, means for securing the casing sections together at said outlets, the said ends of the conductor being held between the respective sections at said outlets, and electric heating means within the casing for heating the conductor.

4. An electric heater having, in combination, a casing shaped to provide two neck portions, the casing being divided into two sections in a plane passing substantially axially through said neck portions, a conductor within the casing having its ends extending into said neck portions, the said ends of the conductor having exterior depressions therein and the neck portions having internal projections to occupy said depressions for securing said ends in place, means for clamping the casing sections together, and electric heating means within the casing for heating said conductor.

5. An electric heater having, in combination, a casing having two outlets, the casing being divided into two sections on a plane passing substantially axially through said outlets, a conductor within the casing having its ends passing through the outlets, said ends and outlets having inter-engaging portions to secure the ends in place, means for securing the casing sections together, and electric heating means within the casing for heating said conductor.

6. An electric heater having, in combination, a casing provided with two neck portions, the casing being divided into sections on a plane passing longitudinally through said neck portions, a conductor within the casing having heads on its ends which heads are positioned within said neck portions, the heads having external depressions, and the neck portions having internal projections engaging said depressions for securing the heads in place, and nuts threaded upon said neck portions for securing the casing sections together.

7. An electric heater having, in combination, a hollow casing having a flat upper side, a conductor for the fluid to be heated, said conductor being suspended between its ends by the casing, said conductor having a plurality of coils, an electric heating device within the casing and surrounded and supported by certain of said coils, certain other coils being located between the heating device and the upper wall of the casing, a switch and an electric socket, said switch and socket being operatively connected to the heating device and being located upon the lower wall of the casing.

8. An electric heater having, in combination, a casing, an electric heating device therein, a bracket secured to said device, a switch carried by said bracket and projecting through an opening in said casing, connections controlled by said switch for supplying electric power to said heating device, and a conductor for the fluid to be heated coiled about said heating device, the ends of said conductor projecting through the casing and secured thereto and adapted for attachment to other conductors for conveying fluid to and from the heater.

9. An electric heater casing having projections, the casing being composed of sections dividing said projections, and nuts threaded on said projections for securing the casing sections together.

10. An electric heater having, in combination, a hollow casing, a coiled conductor located within and supported at its ends by the casing, and an electric heating device within the casing and supported solely by the coils of the conductor.

11. A heater having, in combination, a conductor, a sectional casing, means for clamping the casing sections together with the conductor therein and its ends projecting between the casing sections, the casing sections serving when clamped together to hold the conductor in position, and means for heating the casing and conductor.

In testimony whereof I hereunto set my hand in the presence of two witnesses.

JENS A. PAASCHE.

In the presence of—
EDNA WESTRAND,
AGNES McCROSKEY.